US009614899B1

(12) United States Patent
Rukonic et al.

(10) Patent No.: US 9,614,899 B1
(45) Date of Patent: Apr. 4, 2017

(54) SYSTEM AND METHOD FOR USER CONTRIBUTED WEBSITE SCRIPTS

(71) Applicant: Intuit Inc., Mountain View, CA (US)

(72) Inventors: Marko Rukonic, San Jose, CA (US); Keith Anders Olson, Livermore, CA (US); Jessie Ann Haffey, Mountain View, CA (US); Robert Cox, Sunnyvale, CA (US)

(73) Assignee: Intuit Inc., Mountain View, CA (US)

( * ) Notice: Subject to any disclaimer, the term of this patent is extended or adjusted under 35 U.S.C. 154(b) by 322 days.

(21) Appl. No.: 14/291,248

(22) Filed: May 30, 2014

(51) Int. Cl.
*H04L 29/08* (2006.01)
*G06F 3/0484* (2013.01)

(52) U.S. Cl.
CPC .......... *H04L 67/10* (2013.01); *G06F 3/04842* (2013.01)

(58) Field of Classification Search
CPC ....... H04L 67/22; H04L 67/306; H04L 43/08; H04L 41/0253; G06Q 30/0224; G06Q 30/0226; G06F 17/30424; G06F 17/30551; G06F 17/3089; G06F 17/30938; G06F 21/566; G06F 11/34; G06F 11/3414; G06F 11/3466; G06F 11/3476; G06F 17/30395; G06F 17/30536
See application file for complete search history.

(56) References Cited

U.S. PATENT DOCUMENTS

| 9,087,035 | B1* | 7/2015 | Bandaru | G06F 17/248 |
| 2002/0023112 | A1* | 2/2002 | Avital | G06F 17/21 715/234 |
| 2002/0032724 | A1* | 3/2002 | Shibusawa | G06F 17/30867 709/203 |
| 2003/0025728 | A1* | 2/2003 | Ebbo | G06F 17/30893 715/744 |
| 2007/0083423 | A1* | 4/2007 | Delbridge | G06Q 10/10 705/12 |

(Continued)

OTHER PUBLICATIONS

Rukonic, "System and Method for Managing Website Scripts," U.S. Appl. No. 14/286,157, filed May 23, 2014.

(Continued)

*Primary Examiner* — Jeffrey A Gaffin
*Assistant Examiner* — Mandrita Brahmachari
(74) *Attorney, Agent, or Firm* — Hawley Troxell Ennis & Hawley LLP; Philip McKay

(57) ABSTRACT

A system and method for managing website scripts includes operations which provide for user contributed website scripts for use by consumer users and computing systems providing services on their behalf. User contributed website scripts are used to periodically gather user data. Following receipt of a user contributed website script, validation operations are performed in order to ensure that the user contributed website script operates properly. Once an initial determination is made that the website script operates properly, award points are awarded to the contributing user, and contribution points are assigned. If performance of the user contributed website script fails after initial acceptance, the number of contribution points associated with the user contributed website script is reduced. If the number of contribution points associated with a user contributed website script falls below a predetermined threshold, the user contributed website script is rendered unavailable for use.

36 Claims, 6 Drawing Sheets

(56) References Cited

U.S. PATENT DOCUMENTS

| | | | |
|---|---|---|---|
| 2008/0120129 A1* | 5/2008 | Seubert | G06Q 10/06 705/35 |
| 2008/0162228 A1* | 7/2008 | Mechbach | G06Q 10/063 705/7.11 |
| 2008/0207327 A1* | 8/2008 | Van Luchene | A63F 13/12 463/42 |
| 2010/0030578 A1* | 2/2010 | Siddique | G06Q 10/0637 705/3 |
| 2010/0070448 A1* | 3/2010 | Omoigui | H01L 27/1463 706/47 |
| 2012/0069131 A1* | 3/2012 | Abelow | G06Q 10/067 348/14.01 |
| 2012/0130786 A1* | 5/2012 | Marshall | G06Q 40/02 705/14.17 |
| 2012/0239417 A1* | 9/2012 | Pourfallah | G06Q 10/00 705/2 |
| 2012/0304286 A1* | 11/2012 | Croll | G06F 21/6263 726/22 |

OTHER PUBLICATIONS

Rukonic, "System and Method for Two-Tiered User Contributed Website Scripts," U.S. Appl. No. 14/303,709, filed Jun. 13, 2014.

* cited by examiner

SYSTEM AND METHOD FOR USER CONTRIBUTED WEBSITE SCRIPTS

BACKGROUND

Computing systems are ubiquitous, and serve the needs of computing system users throughout the world. Application programs of all types have been developed to execute on those computing systems to help those computing system users in a wide variety of tasks.

Some application programs, in the area of personal finance for example, are developed with the consumer focus, and thus execute on computing systems owned and/or operated by consumers. Some of those consumer focused personal finance application programs interface with other computing systems, such as banking related computing systems, to download, analyze, and otherwise operate with user specific banking data associated with the user.

Other computing systems have been implemented which have application software designed to serve many consumers at a time. In the area of personal finance, for example, Mint™ of Intuit Inc, is regularly used by many consumers to acquire and analyze or otherwise operate on their financial data. Exemplary tasks that consumers perform using Mint™, for example, include paying bills, analyzing and tracking their expenses, and preparing and tracking budgets.

In the example of paying bills, such third-party computing systems typically use consumer provided data about merchants and others who send them bills, also called billers, when the consumer indicates that they wish to pay a bill. In a typical scenario, a consumer provides the third-party computing system with biller data such as the biller's name, address and phone number, how much the consumer wishes to pay the biller, and a date when the payment should be made.

There are many types of businesses that consumers may wish to pay using bill pay functionality of personal finance software. Some of those businesses may interact with a consumer's bank or bill pay service, providing information such as how much is owed in a particular payment, and when that payment is due. However, other businesses may not be affiliated with the consumer's bank. For those businesses that are not affiliated with the consumer's bank, the consumer must typically provide the data themselves.

Some businesses that consumers do business with, such as electric and gas utility businesses, phone companies, mortgage companies, automobile loan companies, banks and other financial institutions, and any other business that the consumers do business with, may provide webpages of the business which allow interested parties to gather data about the business, and which may further allow consumers of the business to become authorized to view special pages within the webpages of the business which are specifically directed to account statuses of the consumer, balances of the consumer, when a last payment was made by the consumer to the business, the amount of that last payment, and other details which may be important to consumers.

In some situations, a large number of consumers have one or more accounts with a third-party computing system providing a financial management application program to assist those consumers. If enough of those consumers do business with a particular business that has a website, such as a utility company, there may be enough justification for the application developers associated with the third-party computing system to develop a website scraping process through which consumer-specific business data associated with those consumers may be gathered from areas of the business website dedicated to providing the user data about their accounts.

Screen scraping processes are very tedious to create, since they must typically operate for a very large number of users, in order to justify the amount of work required in creating the screen scraping processes. Typically, an application program has a single large screen scraping process which handles a large number of webpages and many different conditions which may be associated with many different consumers. Further, a webpage produced for one user may look differently than the same webpage produced for a different user. A website may appear to be a single webpage, but a screen scraping process must treat each different version of a page as a different webpage, or a different website. Because of the wide variety of situations that the various consumers may be in with respect to the business, or because the business website provides different views to different customers, a typical screen scraping process, such as described above, requires a lot of testing and branching, creating different execution paths, to ensure that all conditions for all consumers are satisfied by the one screen scraping process.

Screen scraping processes such as described above also typically require constant update due to the structure or other details of the webpages being changed, for one reason or another. Further, due to the large number of potential businesses that have websites that provide user data to users, the number of different screen scraping processes that would be needed to satisfy the large number of consumers using a large number of businesses is typically more than a standard development team can manage. Therefore, screen scraping processes are typically only developed to operate on websites where a very large percentage of the customer base does business.

Therefore, it would be beneficial to have a system whereby many contributors are enabled to create user contributed website scripts for gathering data from various websites those contributors use.

SUMMARY

A system and method for user contributed website scripts includes operations for the creation and receipt of user contributed website scripts from users of a community, and for automatic use and management of those user contributed website scripts. In one embodiment, users of the community are the users of a particular financial management program, or other application program or system employing one or more features of the system and method for user contributed website scripts.

In one embodiment, a system for user contributed website scripts includes one or more computing processors and one or more memories coupled to the computing processors, the memories including instructions which when executed by any of the computing processors, perform a process for user contributed website scripts.

In one embodiment, the process for user contributed website scripts begins with receiving user data identifying a user, in order for process for user contributed website scripts to authenticate or otherwise identify a user to the process for user contributed website scripts. In one embodiment, the user data identifying a user includes one or more of a username and a password. In one embodiment, the user may alternatively be identified through other means, such as through a web browser cookie associated with a web browser the user is using.

In one embodiment, following the user being identified to or authenticated with the process for user contributed website scripts, the process proceeds with determining one or more external websites for which a new user contributed website script is desired. These external websites are websites of businesses that consumers do business with, such as electric and gas utility businesses, phone companies, mortgage companies, automobile loan companies, banks and other financial institutions, and any other business that the consumers do business with, and which provide webpages of the business which may be scraped by user contributed websites created by users, using a process for user contributed websites as disclosed herein.

In one embodiment, this determination is made through identifying one or more website-related accounts of the user and then determining one or more websites associated with those accounts for which fewer than a desired number of user contributed website scripts are available to the process for user contributed website scripts.

In one embodiment, a list of the one or more websites for which a new user contributed website script is desired is presented to the user so that the user may select one of the listed websites for which they wish to create a user contributed website script.

In one embodiment, the user selects one of the listed websites and creates a user contributed website script for the selected website.

In one embodiment, if there is only one website for which a new user contributed website script is desired, the user is presented with a prompt asking whether the user wishes to prepare a user contributed website script for the one website. In one embodiment, if the user responds affirmatively, the process for user contributed website scripts treats the one website as if it had been selected by the user.

In one embodiment, the creation of a user contributed website script occurs either through use of a script creation plug-in of a web browser, or manually, with the user determining the various operations of the user contributed website script through normal programming processes. In one embodiment, at an appropriate point in the process for user contributed website scripts, if the user wishes to use a script creation plug-in to create a user contributed website script, the process includes determining whether a script creation plug-in is active within a web browser of the user. In one embodiment, if a script creation plug-in is not active within a web browser of the user, an appropriate script creation plug-in for the web browser the user is using is downloaded and activated for use.

In one embodiment, if a script creation plug-in was determined to be active within a web browser of the user, or has been downloaded and activated, user input is received, through the plug-in, of one or more script operations of a user contributed website script.

In one embodiment, following creation of a user contributed website script by the user, data of the user contributed web site script of the user is received by the process for user contributed website scripts. The data of the user contributed website script includes, in one embodiment, one or more user contributed website script operations designed to be performed on the associated website on behalf of and using data of the user, such as authentication information.

In one embodiment, the process for user contributed website scripts further includes determining whether the user contributed website script performs successfully. In one embodiment, determining whether the user contributed website script performs successfully includes performing one or more of the operations of the user contributed website script on data of the selected website. In one embodiment, determining whether the user contributed website script performs successfully includes performing each of the operations of the user contributed website script on data of the selected website. In one embodiment, successful performance of the user contributed website script includes completely performing each of the operations of the user contributed website script correctly, without failure.

In one embodiment, a user contributed script is provided to executing a payment, for example, to the business represented by the associated website for which the user contributed web site script was created. In one embodiment, process for user contributed website scripts verifies that all the elements indicated by user are at xpath locations designated in the user contributed website script, without actually executing the payment. In another embodiment, an increase in the number of award points associated with a contributing user who contributed a user contributed website script for making a payment is authorized following verification that all the elements indicated by user are at xpath locations designated in the user contributed website script.

In one embodiment, after the user contributed web site script is determined to have performed successfully, the process further includes storing the user contributed website script and activating the user contributed website script for use on behalf of at least one user.

In one embodiment, storing the user contributed website script and activating the user contributed website script for use, includes storing information regarding the user contributed website script or information otherwise derived from data of the user and/or activities associated with the creation of the user contributed website script with other data associated with the user.

In one embodiment, storing the user contributed web site script and activating the user contributed website script for use includes storing the user contributed website script in a location of the database designated for user contributed website scripts of the community.

In one embodiment, storing the user contributed web site script and activating the user contributed website script for use includes activating the user contributed website script for use by the contributing user.

In one embodiment, storing the user contributed web site script and activating the user contributed website script for use includes activating the user contributed website script for use by any user of the community.

In one embodiment, the process for user contributed website scripts further includes, following a determination that the user contributed website script performed successfully, increasing a number of award points associated with the contributing user.

In one embodiment, the process for user contributed website scripts further includes, following a determination that the user contributed website script performed successfully, increasing a number of contribution points associated with the user contributed website script.

In one embodiment, upon the user contributed website script being determined to have performed unsuccessfully, the process further includes providing feedback to the contributing user. In one embodiment, the feedback provided to the contributing user includes data regarding one or more operations of the user contributed website script that failed to perform correctly.

In one embodiment, at some time following the user contributed website script being activated for use, the process for user contributed website scripts includes performing, during a script refresh period, operations of the user contributed website script on data of the selected website. In one embodiment, if performance of the user contributed web site script on data of the selected website fails for any reason, a number of contribution points associated with the user contributed website script is reduced by a predetermined amount.

In one embodiment, the process for user contributed website scripts includes, determining whether the number of contribution points associated with a particular website script exceeds a predetermined release amount. In one embodiment, if a determination is made that the contribution points associated with a particular website script exceeds a predetermined release amount, data associated with the particular website script is added or updated to reflect that the particular website script is available for use by all users of the community.

In one embodiment, following a determination that performance of a particular website script has failed, and a corresponding reduction has been made in the number of contribution points associated with the failed website script, process for user contributed website scripts determines whether the number of contribution points now associated with the failed website script is below a decommission amount. In one embodiment, if a determination is made that the number of contribution points now associated with the failed website script is below a decommission amount, data associated with the failed website script is added or updated to reflect that the failed website script is no longer available for use.

In one embodiment, when data associated with the failed website script is added or updated to reflect that the failed website script is no longer available for use, the failed website script is decommissioned with respect to users of the community, but remains available for use by any contributing user associated with that failed website script. In one embodiment, if the failed website script is determined to be associated with a number of contribution points fewer than a predetermined threshold for contributing users, the failed website script is decommissioned entirely, and is thus no longer accessible to any user of the community, including contributing users.

In one embodiment, one or more websites for which users contribute user contributed website scripts are websites of billers, a biller being a product or service provider providing one or more products directly to or on behalf of the user.

Figure 1:
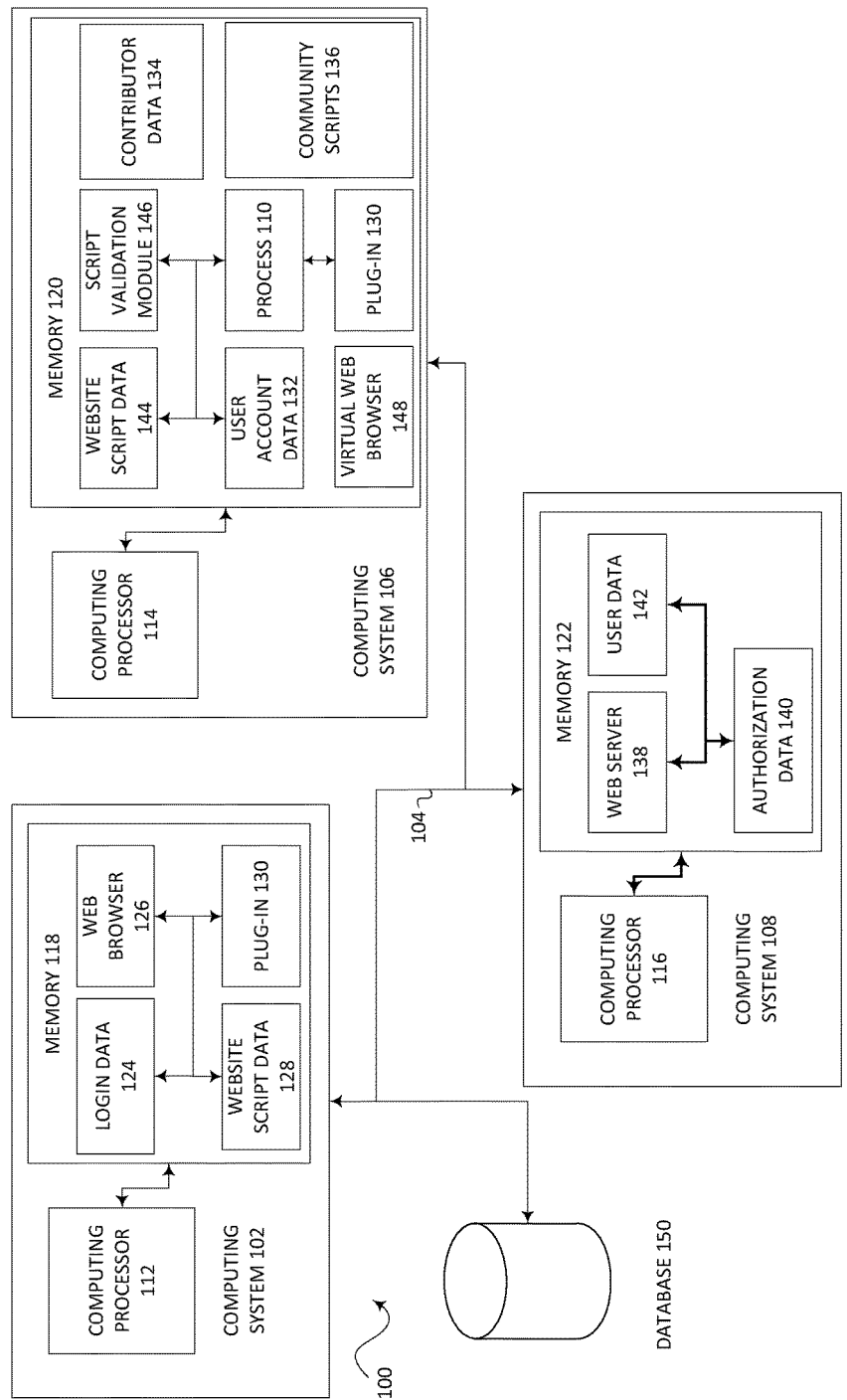
FIG. 1 is a functional block diagram showing the interaction of various elements for implementing one embodiment of a system and method for user contributed website scripts.
Figure 2A:
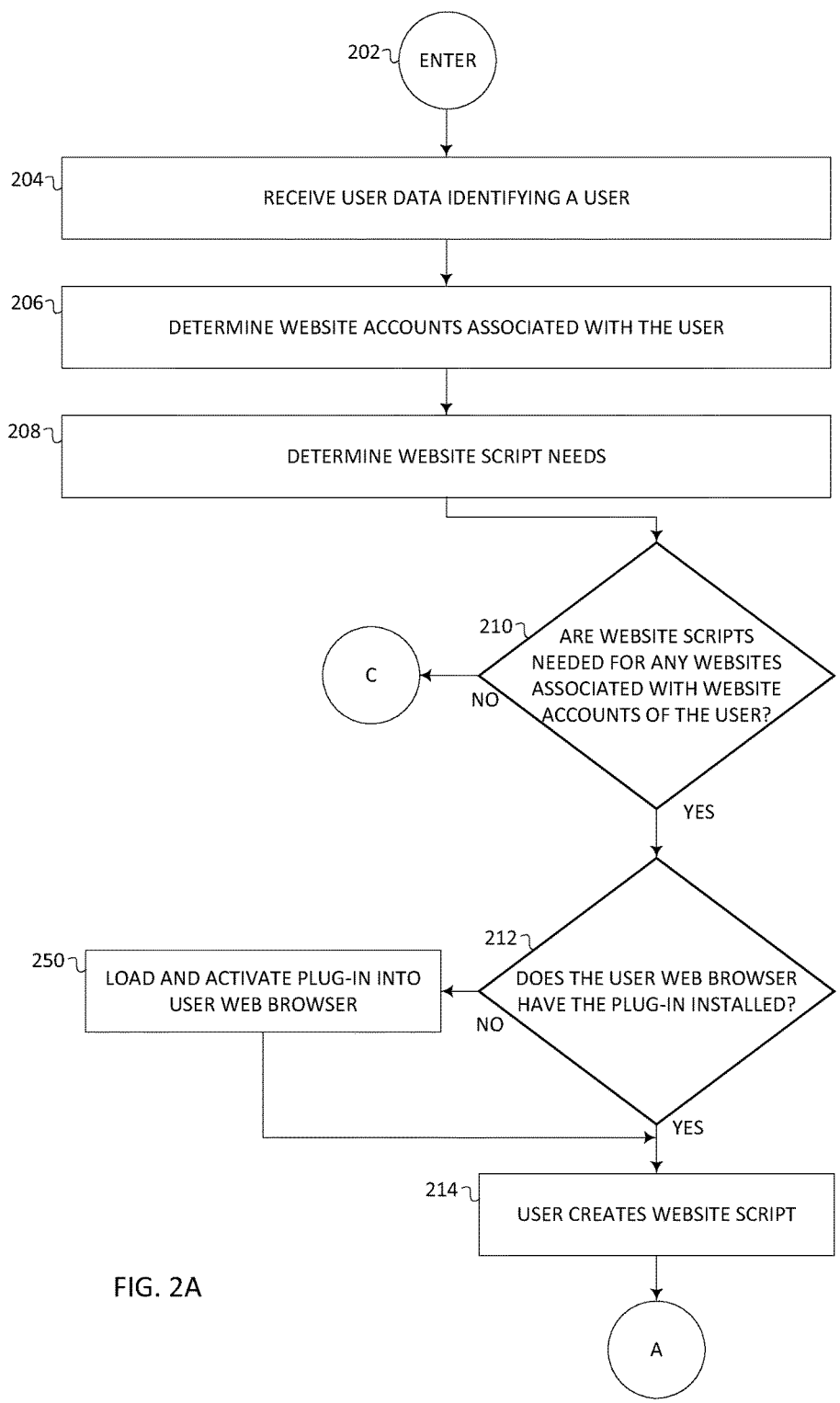
FIG. 2 includes FIG. 2A, FIG. 2B, FIG. 2C and FIG. 2D which together form a flowchart depicting a process for user contributed website scripts in accordance with one embodiment.
Figure 2B:
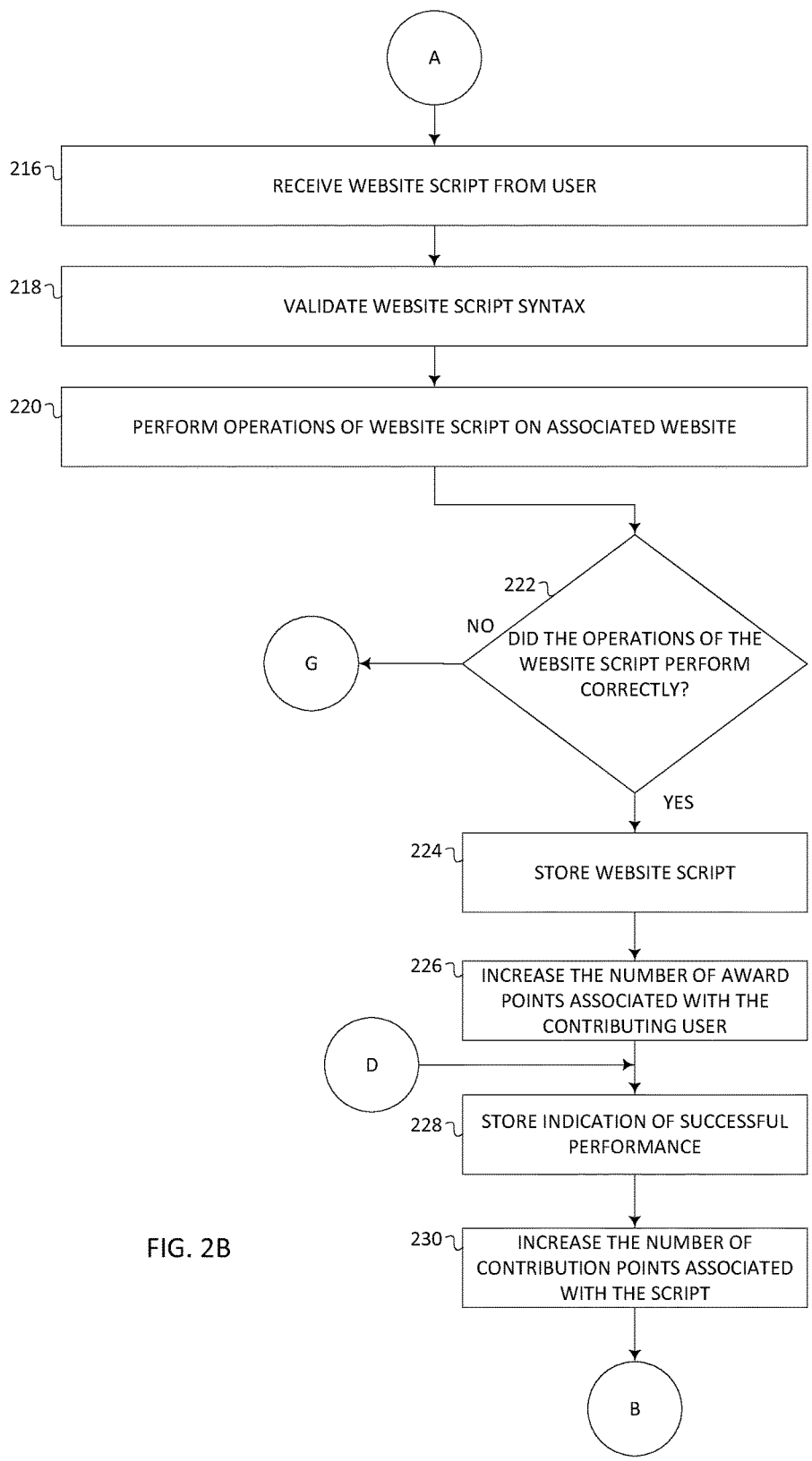
Figure 2C:
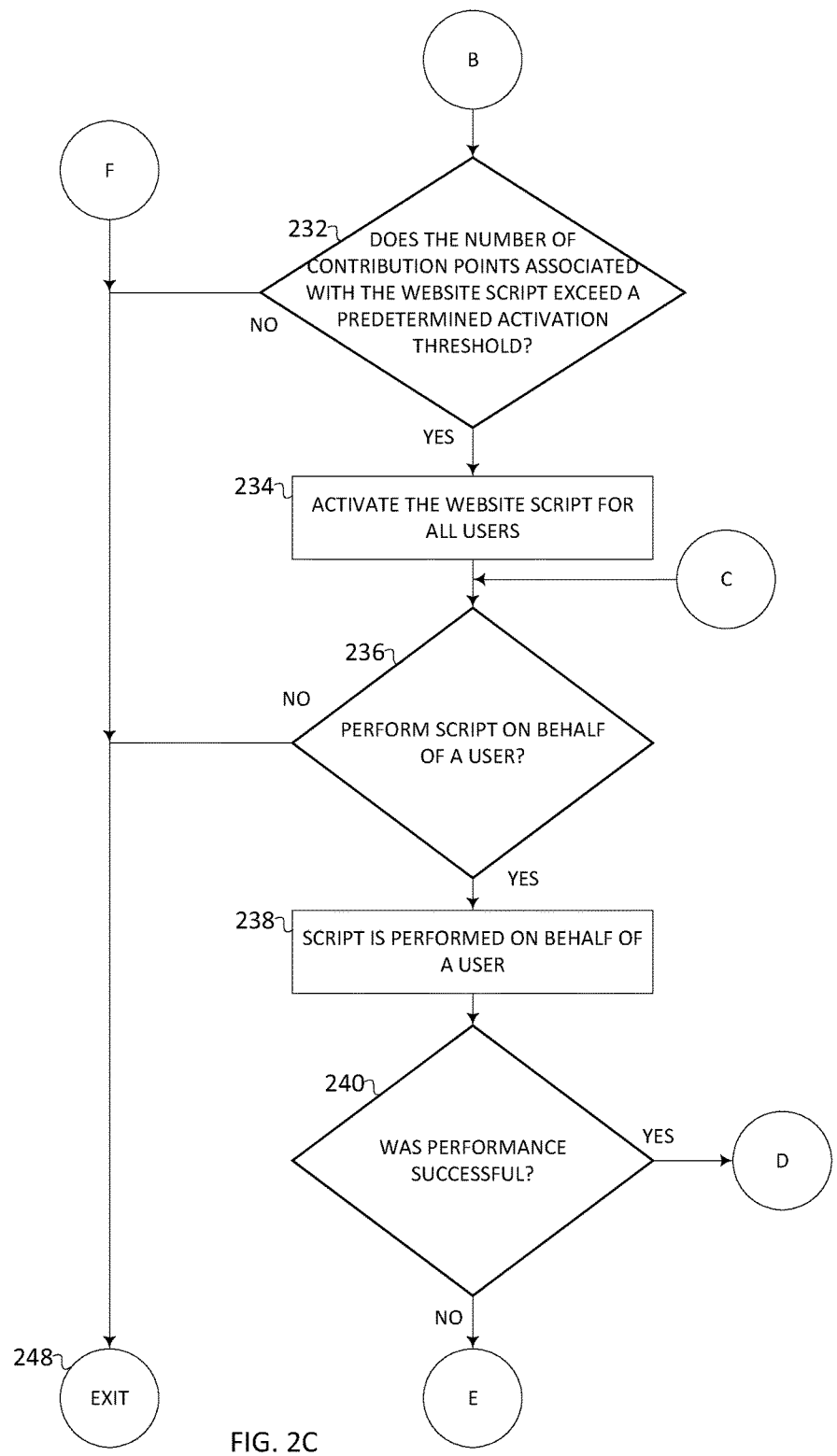
Figure 2D:
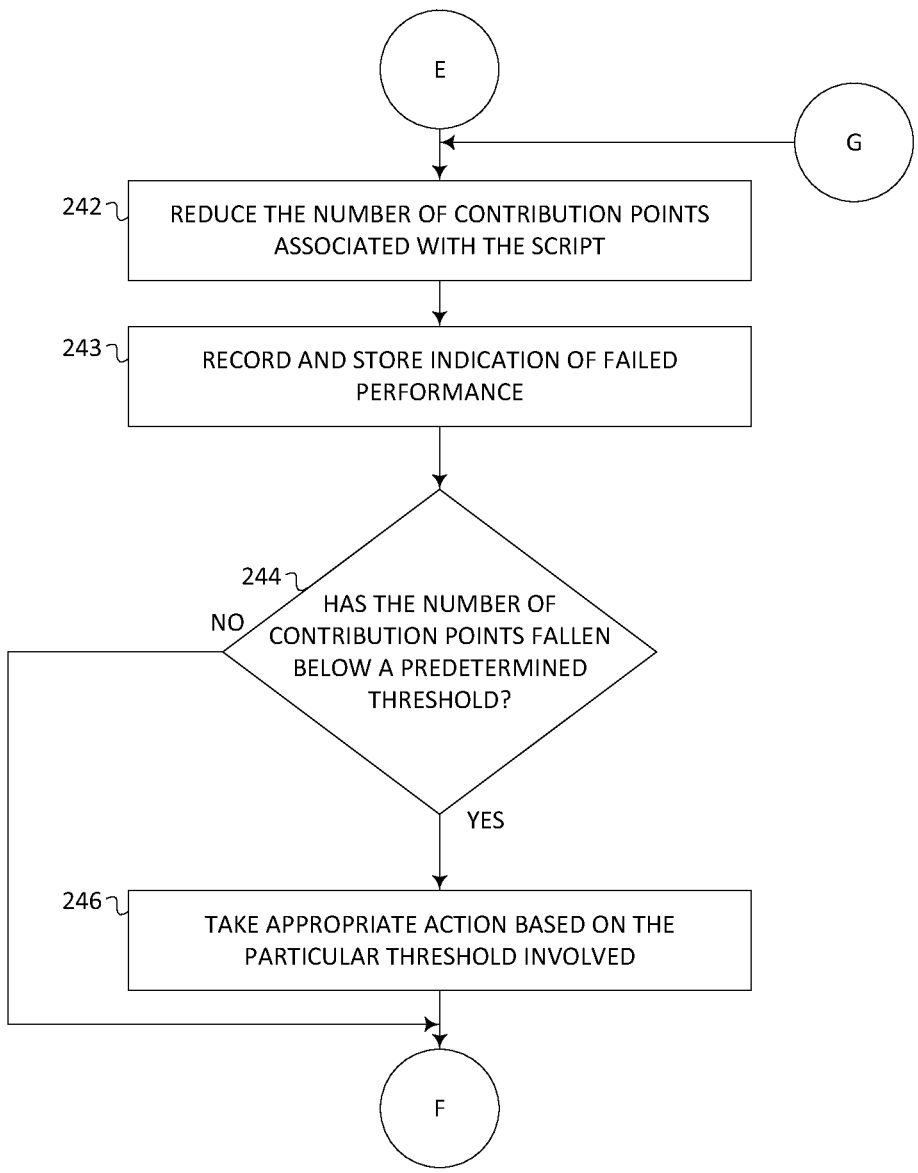

Common reference numerals are used throughout the figures and the detailed description to indicate like elements. One skilled in the art will readily recognize that the figures are examples and that other architectures, modes of operation, orders of operation and elements/functions can be provided and implemented without departing from the characteristics and features of the invention, as set forth in the claims. Unless specifically stated, operations discussed herein may be implemented in any order or combined, as determined by the designer of a system implementing the subject matter described herein.

DETAILED DESCRIPTION

A system and method for user contributed website scripts includes operations which provide for user contributed website scripts in order to provide efficient operation for consumer users and computing systems providing services on their behalf. User contributed website scripts are used, as discussed herein, to periodically gather user data from an associated website.

Following receipt of a user contributed website script, one or more validation operations are performed on the user contributed website script, in order to ensure that the user contributed website script is formatted properly, has the proper syntax, and operates properly. Once an initial determination is made that the user contributed website script operated properly, award points may be awarded to the contributing user, and contribution points may be assigned to the user contributed website script. If performance of the user contributed website script fails after initial acceptance, the number of contribution points associated with the user contributed website script is reduced. If the number of contribution points associated with a user contributed website script falls below a predetermined threshold, the user contributed website script is rendered unavailable for use.

Embodiments will now be discussed with reference to the accompanying figures, which depict one or more exemplary embodiments. Embodiments may be implemented in many different forms and should not be construed as limited to the embodiments set forth herein, shown in the figures, and/or described below. Rather, these exemplary embodiments are provided to convey the principles of the invention, as set forth in the claims, to those of skill in the art.

FIG. 1 is a functional block diagram showing the interaction of various elements for implementing one embodiment of a system and method for user contributed website scripts.

Referring to FIG. 1, in one embodiment, system 100 for user contributed website scripts includes one or more of a first computing system, such as computing system 102, operatively coupled through one or more communication channels, such as communication channel 104, to a second computing system, such as computing system 106, and to a third computing system, such as computing system 108. In one embodiment, the first computing system, such as computing system 102, is a consumer computing system under the control of a consumer. In one embodiment, the second computing system, such as computing system 106, is a third-party computing system for executing and managing the operations of process for user contributed website scripts 110. In one embodiment, the third computing system, such as computing system 108, is a computing system responsible for providing one or more websites. In one embodiment, the one or more websites are websites of one or more billers, a biller being a product or service provider providing one or more products on behalf of the user. In one embodiment, one or more of the biller websites are websites of utility companies, such as an electric utility company, a gas utility company, a cable company, or a telephone company.

In one embodiment, computing systems 102, 106, and 108 each have one or more respective computing processors, such as computing processors 112, 114, and 116. Computing systems 102, 106, and 108 each also have one or more respective memories, such as memories 118, 120, and 122.

Computing processors 112, 114, and 116 are respectively coupled to memories 118, 120, and 122, and are thus configured to execute instructions stored in those respective memories, for example, computing processor executable instructions to perform a process, such as process for user contributed website scripts 110 of computing system 106.

As used herein, the term "computing system" includes, but is not limited to, a virtual asset; a server computing system; a workstation; a desktop computing system; a mobile computing system, including, but not limited to, smart phones, portable devices, and/or devices worn or carried by a user; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the term computing system can denote, but is not limited to, systems made up of multiple: virtual assets; server computing systems; workstations; desktop computing systems; mobile computing systems; database systems or storage clusters; switching systems; routers; hardware systems; communications systems; proxy systems; gateway systems; firewall systems; load balancing systems; or any devices that can be used to perform the processes and/or operations as described herein.

In one embodiment, two or more assets, such as computing systems and/or virtual assets, and/or two or more computing environments, are connected by one or more communications channels including but not limited to, Secure Sockets Layer communications channels and various other secure communications channels, and/or distributed computing system networks, such as, but not limited to: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network", or alternatively, "communication channel", includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

In one embodiment, memory 118 of computing system 102 includes login data 124, web browser 126, website script data 128, and plug-in 130. In one embodiment, a user of computing system 102 is an authorized user of a user account of computing system 106, represented within user account data 132. User account data 132, in one embodiment, includes authorization data which, when matched by other data, such as login data 124 of computing system 102, authorizes the user of computing system 102 to perform one or more tasks of computing system 106. In one embodiment, the user of computing system 102 interacts with and provides login data 124, through web browser 126 of computing system 106, to computing system 106.

In one embodiment, login data 124 is provided automatically, such as if one or more of a username, password, or other authorization data were previously stored within computing system 102. In one embodiment, login data 124 is provided manually, through user input supplied by a user of computing system 102.

In one embodiment, a determination is made at the second computing system, such as computing system 106, that some or all of login data 124 matches at data within user account data 132. In one embodiment, enough of login data 124 matches with data of user account data 132 sufficient to determine that a user of computing system 102 is an authorized user of computing system 106.

In one embodiment, following a determination that a user of computing system 102 is an authorized user of computing system 106, a determination is made using data of the authorized user and data of available user contributed website scripts, such as a user account data 132, contributor data 134, and community scripts 136 that there are one or more accounts of the user, such as one or more biller accounts, that are associated with websites for which additional user contributed website scripts are desired.

In one embodiment, data indicating the one or more biller accounts associated with websites for which additional user contributed website scripts are desired is formed into a list or other form of presentation and provided to computing system 102, at which time the data is presented to the user. If, in one embodiment, the presented data includes two or more websites for which new user contributed website scripts are desired, input is received from the user indicating a selection of a website the user wishes to interact with to create a new user contributed website script.

In one embodiment, plug-in 130 is already present within memory 118 of computing system 102, and is activated for use with the selected website to create a new user contributed website script.

In one embodiment, plug-in 130 is not already present within memory 118 of computing system 102, and therefore is downloaded from memory 120 of computing system 106 to memory 118 of computing system 102. Once plug-in 130 is downloaded, it is installed or otherwise associated with web browser 126 of computing system 102, and activated for use in creating a new user contributed website script.

During the creation of a new user contributed website script, web browser 126 of computing system 102 loads data of the selected website provided by web server 138 of computing system 108. In one embodiment, the user of computing system 102 provides login data for the website provided by web server 138, which is then verified with authorization data 140 of computing system 108 in order to verify that the user of computing system 102 is an authorized user of the website provided by web server 138.

Once verification is complete, and therefore once the user of computing system 102 is verified as an authorized user of the website provided by web server 138, web server 138 incorporates, in one embodiment, at least a portion of user data 142 into a user specific version of the website provided by web server 138. In one embodiment, for example, the user specific version of the website provided by web server 138, which includes at least a portion of user data 142, is a webpage or set of webpages which provide user specific data, such as a user account number, a user account balance, a last bill amount, a last paid amount, a last due date, a last paid date, and auto pay status, a paperless status, a bill PDF, or any other user specific data that that is deemed useful to provide to authorized users of computing system 108.

In one embodiment, the user of computing system 102 creates a user contributed website script including one or more operations to gather data of the user specific data of the user specific version of the website provided by web server 138. In one embodiment, the user contributed website script is created manually, in which case the loading and activation of plug-in 130, as described above, is not necessary.

In one embodiment, the user contributed website script is created using plug-in 130, which will be described in more detail below. Once the user contributed website script is complete, data representing the user contributed website script is provided to computing system 106, for example, as website script data 144. For convenience, this disclosure will occasionally reference this newly created user website script contributed by a user of computing system 102 as a user contributed website script.

Following receipt of data representing the user contributed website script, such as data represented by website script data 144, script validation module 146 performs one or more validation operations on the data representing the user contributed website script, such as website script data 144.

In one embodiment, performance of one or more validation operations on the data representing the user contributed website script, such as website script data 144, involves loading data of the website provided by web server 138 into virtual web browser 148. Virtual web browser 148 loads and operates on website data of provided websites, but is not required to have any user display features, because the website data of provided websites is being operated on by a computing system according to instructions provided, for example, by script validation module 146 and process for user contributed website scripts 110.

In one embodiment, the one or more validation operations include verifying that the user contributed website scripts utilizes the appropriate syntax. In one embodiment, the syntax required by a user contributed website script is predefined and includes one or more syntax rules.

In one embodiment, the one or more validation operations further includes performing one or more of the operations defined by data of the user contributed website script, such as website script data 144. In one embodiment, the one or more validation operations further includes performing each of the operations defined by data of the user contributed website script, such as website script data 144.

In one embodiment, performance of one or more of the operations defined by data of the user contributed website script includes, for example, using data of the user of computing system 102, such as login data 124, which, in one embodiment, has been previously provided to computing system 106 and which is further stored with other data of the user of computing system 102, such as within user account data 132. In one embodiment, performance of one or more of the operations defined by data of the user contributed website script includes logging in, automatically, by computing system 106, to the website produced by web server 138 on behalf of the user of computing system 102.

Recall that by logging into the website produced by web server 138, using credentials of the user of computing system 102, causes web server 138 to produce one or more user specific webpages which include user specific data associated with the user of computing system 102, such as user data 142.

In one embodiment, performance of one or more of the operations defined by data of the user contributed website script includes scraping or otherwise acquiring, from the one or more user specific webpages, user data of the user, such as a user account number, an account balance, a last bill amount, a last paid amount, a last due date, a last paid date, an auto pay status, a paperless status, or any other appropriate user specific data able to be scraped from the one or more user specific webpages of web server 138.

Further operations are performed by process for user contributed website scripts 110, based on success or failure of the performance of the operations of the user contributed website script, which will be discussed in more detail below.

Although various data and instructions relating to process for user contributed website scripts 110 have been described as being associated with particular computing systems, such as login data 124 being associated with computing system 102, and plug-in 130, user account data 132, contributor data 134, and community scripts 136 being associated with computing system 106, authorization data 140 and user data 142 being associated with computing system 108, those of ordinary skill will readily appreciate that one or more processes described herein, such as process for user contributed website scripts 110, may also be designed to utilize external storage, such as database 150, together with or as an alternative to the various memories and/or other storage mechanisms of the various computing systems, such as a hard drive, DVD, or other storage mechanism. Thus, for example, plug-in 130, or other data or instructions described herein, may be stored in database 150, and downloaded into computing system 102, or other appropriate computing systems as discussed herein, when needed.

In one embodiment, one or more of the processes discussed herein are automatic, and are performed regularly, without human intervention.

In one embodiment, a process for user contributed website scripts, and/or a financial management system, is/are computer applications or processes and/or data implemented and/or run and/or stored, in full, or in part, in, or on, and/or through, a computer program product. Herein, a computer program product comprises a medium and/or I/O device configured to store or transport computer readable code or data, whether available or known at the time of filing or as later developed. Some examples of computer program products are CDs, DVDs, ROM cards, floppy discs, magnetic tapes, computer hard drives, portable hard drives, flash memory, volatile and non-volatile memory sticks, servers on a network, or other media or process capable of delivering computer readable data representing computer readable code, whether available or known at the time of filing or as later developed. This medium may belong to a computing system or the medium may be removable and/or remote from the computing system.

The instructions stored on the computer program product may be loaded into the memory of a computing system and executed by a computing processor, to perform the operations of process for user contributed website scripts 110.

FIG. 2 includes FIG. 2A, FIG. 2B, FIG. 2C and FIG. 2D, which together form a flowchart depicting a process for user contributed website scripts in accordance with one embodiment.

In one embodiment, a process for user contributed website scripts, such as process for user contributed website scripts 110, includes process operations for receiving website scripts from consumer computing system users, the user contributed website scripts being associated with a biller website and configured with one or more scripting operations for gathering data from one or more webpages of the biller website.

Users of the biller websites are most familiar with their own data, and are thus uniquely well positioned to assist with and perform user contributed website script creation operations.

Referring to FIG. 1 and FIG. 2 together, a process for user contributed website scripts 110 begins at ENTER OPERATION 202 and proceeds with RECEIVE USER DATA IDENTIFYING A USER OPERATION 204.

In one embodiment, at a time determined by a user, such as a user of computing system 102, the user initiates communication between computing system 102 and computing system 106. In one embodiment, the user initiated communication begins with the user of computing system 102 utilizing web browser 126 to load, for example, a website of computing system 106.

Computing system 106, in one embodiment, is a third-party computing system implementing, for example, a financial management system to help a wide variety of users manage their finances.

As explained earlier, in the area of personal finance, for example, Mint™, a financial management system of Intuit Inc, is regularly used by many consumers to acquire, analyze, or otherwise operate on their financial data. Exemplary tasks that consumers perform using Mint™, for example, include paying bills, analyzing and tracking their expenses, and preparing and tracking budgets.

In the example of paying bills, third-party computing systems, such as computing system 106, gather and use user data in order to assist a user of the financial management system with financial management tasks. In one embodiment, a financial management system employing process for user contributed website scripts 110, for example, allows users of the financial management system to help the financial management system automatically perform tasks on the user's behalf. By creating user contributed website scripts, users enable an application program, such as the financial management system, to efficiently gather user data to be used by the financial management system to help the user with financial tasks.

In one embodiment, RECEIVE USER DATA IDENTIFYING A USER OPERATION 204 includes receiving, by computing system 106 from computing system 102, data sufficient to identify the associated user as being authorized to access and/or use user account data of computing system 106.

In one embodiment, the user data received from computing system 102 is provided through web browser 126 to a webpage provided by computing system 106 as an entry point into a financial management program.

In one embodiment, if, for example, process for user contributed website scripts 110 is included in a financial management application program, the user data received at RECEIVE USER DATA IDENTIFYING A USER OPERATION 204 is user data sufficient to identify the associated user as being an authorized user of the financial management application program.

In one embodiment, the user data received at RECEIVE USER DATA IDENTIFYING A USER OPERATION 204 includes one or more of a username, a password, a network address of computing system 102, or any other user data deemed sufficient to identify a user as being an authorized user of computing system 106.

Following receipt of the user data, at RECEIVE USER DATA IDENTIFYING A USER OPERATION 204, the user of computing system 102 is validated as an authorized user of computing system 106 through the comparison of at least a portion of the received user data, such as login data 124, with predetermined authorization data associated with a user account of computing system 106, such as a portion of user account data 132.

Following receipt of the user data, at RECEIVE USER DATA IDENTIFYING A USER OPERATION 204, and, following validation of the user of computing system 102 as an authorized user of computing system 106, if needed, process flow proceeds to DETERMINE WEBSITE ACCOUNTS ASSOCIATED WITH THE USER OPERATION 206.

In one embodiment, at DETERMINE WEBSITE ACCOUNTS ASSOCIATED WITH THE USER OPERATION 206, a determination is made, using account data previously supplied by the user, of one or more website-based accounts that are associated with the user. For example, in a financial management application program, the user may have previously provided account data indicating that they have a user accessible website-based account with their electric utility company. In another example, the user may have previously provided account data indicating that they have a user accessible website-based account with their telephone company, or their water company, or their gas company, or one or more merchants, credit card companies, or any other companies that the user does business with.

In one embodiment, once providing the account data to process for user contributed website scripts 110, or when providing the account data to a financial management application program or other program incorporating process for user contributed website scripts 110, the user provides one or more of a network address or URL for the website where the user may login to view their account, a username, and a password, or any other data desired by designers of a particular implementation of process for user contributed website scripts 110.

Following a determination, at DETERMINE WEBSITE ACCOUNTS ASSOCIATED WITH THE USER OPERATION 206, of one or more website-based accounts associated with the user, process flow proceeds with DETERMINE WEBSITE SCRIPT NEEDS OPERATION 208.

In one embodiment, at DETERMINE WEBSITE SCRIPT NEEDS OPERATION 208, an analysis is performed on the one or more website-based accounts of the user determined at DETERMINE WEBSITE ACCOUNTS ASSOCIATED WITH THE USER OPERATION 206 to determine whether enough user contributed website scripts are available to process for user contributed website scripts 110 for each of the websites represented by the user's website-based accounts.

In one embodiment, if fewer than a predetermined number of user contributed website scripts for one or more of the websites determined at DETERMINE WEBSITE ACCOUNTS ASSOCIATED WITH THE USER OPERATION 206 are accessible to the process, a determination is made that there are not enough user contributed website scripts for those one or more websites associated with the determined website-based accounts. In one embodiment, the predetermined number of user contributed website scripts is a fixed number, such as five, or ten, or any other number of website scripts predetermined by a designer of a particular implementation of process for user contributed website scripts.

In one embodiment, a desired number of user contributed website scripts for a particular website associated with a website-based account is based on how many users of process for user contributed website scripts 110 are represented by user account data, such as user account data 132.

In one embodiment, a desired number of user contributed website scripts for a particular website associated with a website-based account is based on how many users of process for user contributed website scripts 110 have accounts with the same business, and thus the same website.

For example, in the case of considering how many user contributed website scripts are desired for an electric utility website, process for user contributed website scripts 110, in one embodiment, will set the predetermined number of desired user contributed website scripts for the electric utility website based on how many users of process for user contributed website scripts 110 have website-based accounts at the electric utility website. In this example, the predetermined number of desired user contributed website scripts for the electric utility website will initially be low, such as perhaps three or four desired user contributed website scripts for the electric utility website, if the number of users of process for user contributed website scripts 110 that have website-based accounts at the electric utility website is low, such as under 100.

In a second example with the same electric utility website, the predetermined number of desired user contributed website scripts for the electric utility website is determined based on a ratio, for example, such as one user contributed website script for every five users, one user contributed website script for every 20 users, or may be determined based on any criteria desired by a designer of process for user contributed website scripts 110.

In one embodiment, at DETERMINE WEBSITE SCRIPT NEEDS OPERATION 208, a particular website associated with a user account of the user is eligible to be determined to need a user contributed website script from this user even if this same user has contributed a user contributed website script for that particular website in the past.

In one embodiment, at DETERMINE WEBSITE SCRIPT NEEDS OPERATION 208, a particular website associated with a user account of the user is ineligible to be determined to need a user contributed website script from this user if this user has previously contributed a user contributed website script for that particular website in the past.

In one embodiment, at DETERMINE WEBSITE SCRIPT NEEDS OPERATION 208, a particular website associated with a user account of the user is eligible to be determined to need a user contributed website script from this user if this user has previously contributed a user contributed website script for that particular website in the past, but one or more of the previously contributed website scripts failed to perform successfully for one or more reasons.

Once a determination has been made of the need for any user contributed website scripts for any websites associated with website-based accounts of the user, at DETERMINE WEBSITE SCRIPT NEEDS OPERATION 208, process flow proceeds with ARE WEBSITE SCRIPTS NEEDED FOR ANY WEBSITES ASSOCIATED WITH WEBSITE ACCOUNTS OF THE USER? OPERATION 210.

In one embodiment, at ARE WEBSITE SCRIPTS NEEDED FOR ANY WEBSITES ASSOCIATED WITH WEBSITE ACCOUNTS OF THE USER? OPERATION 210, if it was determined at DETERMINE WEBSITE SCRIPT NEEDS OPERATION 208 that user contributed website scripts are needed for one or more websites associated with website-based accounts of the user, process flow proceeds to DOES THE USER WEB BROWSER HAVE THE PLUG-IN INSTALLED? OPERATION 212.

In one embodiment, at DOES THE USER WEB BROWSER HAVE THE PLUG-IN INSTALLED? OPERATION 212, a determination is made as to whether a web browser of the user of computing system 102 has a script creation plug-in installed. Recall that a user contributed website script may be created manually, or may instead be created using a script creation plug-in. In one embodiment, a script creation plug-in assists the user in creating a user contributed website script by helping the user determine, for example an XPath describing how to locate and process data presented in a user-specific webpage provided by a webserver, such as web server 138 of computing system 108.

Figure 3:
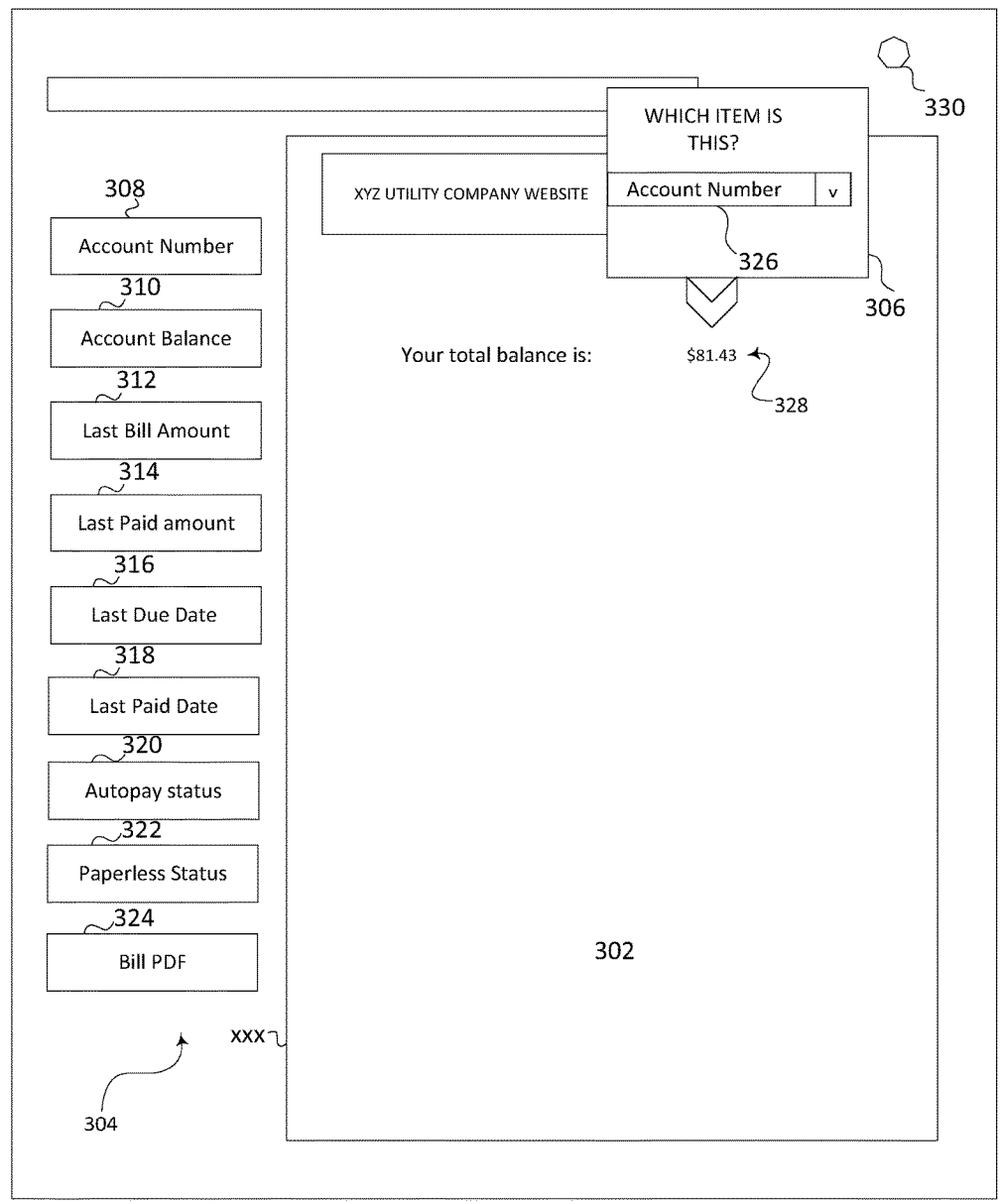
FIG. 3 is a visual representation of a web browser view incorporating a website script creation plug-in and a webpage of a biller website in accordance with one embodiment.

FIG. 3 is a visual representation of a web browser view incorporating a website script creation plug-in and a webpage of a biller website in accordance with one embodiment.

Referring to FIG. 1 and FIG. 3 together, browser 126 is shown in typical operation wherein area 302 is an area of the web browser designed to display a webpage to a user, such as a user of computing system 102. In this example of FIG. 3, web browser 126 has a script creation plug-in loaded and activated for use. Overlays 304 and 306 include functionality to help the user create a user contributed website script. Overlays 304 and 306 may be used together or separately, depending on the design of a particular implementation of the script creation plug-in.

Overlay 304 includes one or more virtual buttons, such as virtual buttons 308, 310, 312, 314, 316, 318, 320, 322, and 324. Although overlay 304 is shown positioned in a particular way, such as on the left side of the browser with the virtual buttons organized in a columnar format, those of ordinary skill will readily appreciate overlay 304 may be positioned in many other ways, without departing from the scope or purpose of the subject matter of this disclosure.

In one embodiment, a user highlights a particular element of data in the presentation of a particular webpage displayed by browser 126, and then activates a virtual button corresponding to the highlighted particular element of data, after which functionality of the script creation plug-in is employed to determine appropriate XPath data to be associated with that highlighted particular element of data. A user contributed website script operation is then created which, when performed, will utilize the XPath data to gather data at the XPath location.

In one embodiment, overlay 306 is not employed together with overlay 304. Alternatively, overlay 306 is employed with overlay 304 to provide additional functionality. Overlay 306 is, in one embodiment, a pop-up window deployed on top of the visual representation of the webpage displayed in area 302 of web browser 126 of computing system 102. In one embodiment, overlay 306 is activated when a user, such as a user of computing system 102 highlights a piece of data within area 302 of web browser 126. In one embodiment, overlay 306 includes drop-down menu 326 which is activated through user input, such as through the use of a mouse, with drop-down menu 326 including one or more possible data attributes to be assigned to that particular highlighted piece of data. For example, assuming the user of computing system 102 has highlighted at least a portion of their account balance 328. The active highlighting of at least a portion of their account balance 328 causes overlay 306 to appear hovering near the highlighted piece of data. The user then utilizes drop-down menu 326 to select which type of data the user has highlighted. In this example, the user would select "Account Balance" from drop-down menu 326 after which the XPath to the highlighted piece of data would be determined and one or more associated operations stored as a website script operation which will eventually be performed automatically by computing system 106 on behalf of the user of computing system 102.

In one embodiment, icon 330 is employed to notify the user of the existence of the script creation plug-in within browser 126. In one embodiment, icon 330 changes from a first representation to a second representation when browser 126 is displaying a webpage for which the script creation plug-in may be employed to create a user contributed website script.

Referring again to FIG. 1 and FIG. 2 together, if, at DOES THE USER WEB BROWSER HAVE THE PLUG-IN INSTALLED? OPERATION 212, a determination is made that the user of computing system 102 has a script creation plug-in installed, process flow proceeds with USER CREATES WEBSITE SCRIPT OPERATION 214.

In one embodiment, at USER CREATES WEBSITE SCRIPT OPERATION 214, the user of computing system 102 utilizes web browser 126 and plug-in 130 to create a user contributed website script represented by website script data 128. In one embodiment, the user of computing system 102 creates a user contributed website script manually, or through an application program of computing system 102 having functionality to assist the user in creating a user contributed website script to gather data from one or more user specific webpages of a website provided by web server 138.

Once creation of a user contributed website script is completed by the user of computing system 102, plug-in 130 of web browser 126 triggers computing system 102 to provide website script data 128 to computing system 106 at which time process flow proceeds with RECEIVE WEBSITE SCRIPT FROM USER OPERATION 216.

In one embodiment, at RECEIVE WEBSITE SCRIPT FROM USER OPERATION 216, data representing one or more user contributed website script operations are received over communication channel 104 by computing system 106 from computing system 102. In one embodiment, the data representing the one or more user contributed website script operations is in the form of an extensible markup language (XML) file. However, the data representing the one or more user contributed website script operations may be in any form preferred by the designers of a particular implementation of process for user contributed website scripts 110.

In one embodiment, following receipt of data representing one or more user contributed website script operations at RECEIVE WEBSITE SCRIPT FROM USER OPERATION 216, process flow proceeds with VALIDATE WEBSITE SCRIPT SYNTAX OPERATION 218.

In one embodiment, at VALIDATE WEBSITE SCRIPT SYNTAX OPERATION 218 the syntax of the website script data, such as website script data 128, received at RECEIVE WEBSITE SCRIPT FROM USER OPERATION 216 is validated to ensure that the received website script data is in proper form, and includes one or more properly formatted user contributed website script operations presented using correct syntax.

In one embodiment, following validation of the user contributed website script syntax at VALIDATE WEBSITE SCRIPT SYNTAX OPERATION 218, process flow proceeds with PERFORM OPERATIONS OF WEBSITE SCRIPT ON ASSOCIATED WEBSITE OPERATION 220.

In one embodiment, at PERFORM OPERATIONS OF WEBSITE SCRIPT ON ASSOCIATED WEBSITE OPERATION 220, one or more of the operations represented by data of the user contributed website script, such as the received website script data 144, are performed on the associated website, such as a website provided by web server 138 of computing system 108.

In one embodiment, at PERFORM OPERATIONS OF WEBSITE SCRIPT ON ASSOCIATED WEBSITE OPERATION 220, each of the operations represented by data of the user contributed website script, such as the received website script data 144 are performed on the associated website.

In one embodiment, performance of each of the operations represented by data of the user contributed website script, at PERFORM OPERATIONS OF WEBSITE SCRIPT ON ASSOCIATED WEBSITE OPERATION 220, includes automatically, and without human intervention, logging into or otherwise authenticating with computing system 108 using data of the user of computing system 102, such as user account data 132. By logging into or otherwise authenticating with computing system 108 automatically, process for user contributed website scripts 110 is able to load a user specific website of web server 138 that includes user specific data of the user of computing system 102, such as user data 142.

In one embodiment, virtual web browser 148 is used to interact with the website provided by web server 138. However, as previously indicated, virtual web browser 148 typically does not need user display functionality, since the purpose of virtual web browser 148 is to perform one or more website operations on the website provided by web server 138, on behalf of a user represented by user account data 132.

In one embodiment, once the one or more operations represented by data of the user contributed website script, such as website script data 144, are performed at PERFORM OPERATIONS OF WEBSITE SCRIPT ON ASSOCIATED WEBSITE OPERATION 220, process flow proceeds with DID THE OPERATIONS OF THE WEBSITE SCRIPT PERFORM CORRECTLY? OPERATION 222.

In one embodiment, at DID THE OPERATIONS OF THE WEBSITE SCRIPT PERFORM CORRECTLY? OPERATION 222, a determination is made as to whether the operations of the user contributed website script performed correctly. In one embodiment, the operations of the user contributed website script will be determined to have performed correctly if they correctly retrieved user specific data of the website provided by web server 138 in the order specified by the user who created the user contributed website script. In one embodiment, each operation of the user contributed website script was performed correctly, without failure of any kind. In one embodiment, failure of any kind to perform the operations of the user contributed website script is not acceptable, and thus in a situation where any failure resulted from performance of the operations of the user contributed website script, a determination will be made that the operations of the user contributed website script performed unsuccessfully.

If, at DID THE OPERATIONS OF THE WEBSITE SCRIPT PERFORM CORRECTLY? OPERATION 222, a determination was made that the operations of the user contributed website script performed correctly, process flow proceeds with STORE WEBSITE SCRIPT OPERATION 224.

In one embodiment, at STORE WEBSITE SCRIPT OPERATION 224, data representing the user contributed website script, such as website script data 144, is stored for later use when performing the user contributed website script on data of the website provided by web server 138 of computing system 108.

In one embodiment, at STORE WEBSITE SCRIPT OPERATION 224, data representing the user contributed website script, such as website script data 144, is stored in a predetermined location of a database where data representing one or more other user contributed website scripts contributed by the user of computing system 102 are also stored.

In one embodiment, at STORE WEBSITE SCRIPT OPERATION 224, data representing the user contributed website script, such as website script data 144, is stored in a predetermined location of a database where data representing one or more other website scripts contributed by other users of the community are stored.

In one embodiment, at STORE WEBSITE SCRIPT OPERATION 224, data representing the user contributed website script, such as website script data 144, is stored in one or more tables of the database, such as database 150. In one embodiment, a first table of a database is dedicated for storing data associated with user contributed website scripts contributed by the contributing user. In one embodiment, the data associated with user contributed website scripts contributed by the contributing user may include, but are not limited to, a number of award points associated with the contributing user, a hash or other representation of one or more user contributed website scripts contributed by the contributing user, user identification data, and a status associated with one or more of the user contributed website scripts contributed by the contributing user.

In one embodiment, a second table of a database is dedicated for storing user contributed website scripts contributed by users of the community. In one embodiment, the data associated with user contributed website scripts contributed by users of the community may include, but are not limited to, a number of contribution points associated with each user contributed website script, a representation of the operations associated with each user contributed website script, and a status associated with one or more of the user contributed website scripts contributed by users of the community.

In one embodiment, an entry made in a first table of the database dedicated for storing user contributed website scripts associated with the contributing user includes a pointer to an entry in the second table of the database dedicated for storing user contributed website scripts contributed by users of the community. Thus, if, for example, a user contributed website script of the second table of the database has been contributed by multiple users, for example by three different users, each first table entry associated with each of the three users who contributed the same user contributed website script will point to the same second table entry where that user contributed website script is stored.

In one embodiment, at STORE WEBSITE SCRIPT OPERATION 224, the user contributed web site script is activated just for use by the contributing user and no other users, for example, users of the community. In one embodiment, at STORE WEBSITE SCRIPT OPERATION 224, the user contributed website script is activated for use by all members of the community, including the contributing user.

In one embodiment, following the completion of storage operations associated with STORE WEBSITE SCRIPT OPERATION 224, process flow proceeds with INCREASE THE NUMBER OF AWARD POINTS ASSOCIATED WITH THE CONTRIBUTING USER OPERATION 226.

In one embodiment, at INCREASE THE NUMBER OF AWARD POINTS ASSOCIATED WITH THE CONTRIBUTING USER OPERATION 226, the number of award points associated with the contributing user is increased by a predetermined amount.

In one embodiment, if a user has not previously contributed any user contributed website scripts, and thus the current user contributed website script is their first contribution to process for user contributed website scripts 110, a greater number of award points may be awarded to the contributing user, such as, for example, twice the predetermined amount of award points, or 50% more than the predetermined amount of award points, or any number of award points desired by a designer of a particular implementation of process for user contributed website scripts 110.

In one embodiment, the number of award points associated with the contributing user is increased by an amount related to how many data items the user contributed website script is created to gather from the website.

In one embodiment, the number of award points associated with the contributing user is increased by an amount determined by taking a predetermined amount which represents contribution of a user contributed website script that would gather user data from a maximum number of fields and reducing the predetermined amount by a predetermined number of decrement points for each field that the user contributed website script doesn't gather data from.

For example, if contribution of a fully enabled user contributed website script would gather nine fields of data and be worth 100 award points, the 100 award points is reduced, in this example, by five award points for each field of the nine fields that the user contributed website script does not gather data from. If, for example, the user contributed website script only gathers data from eight of the nine fields, the number of award points added to the user's prior total of award points would be 95 award points instead of 100 award points, of the reduction being associated with the one field that the user did not create one or more script operations to gather data from.

In one embodiment, according to the example where a first table of a database is dedicated for storing data associated with user contributed website scripts contributed by the contributing user, the number of award points associated with the contributing user is stored in the first table, and that number of award points is increased by the predetermined amount, upon successful performance of a user contributed website script that was contributed by the contributing user.

In one embodiment, following completion of INCREASE THE NUMBER OF AWARD POINTS ASSOCIATED WITH THE CONTRIBUTING USER OPERATION 226, process flow proceeds with STORE INDICATION OF SUCCESSFUL PERFORMANCE OPERATION 228.

In one embodiment, at STORE INDICATION OF SUCCESSFUL PERFORMANCE 228, one or more indicators of successful performance are stored with either or both of data associated with the contributing user, such as contributor data 134, and data associated with one or more entries in a table of the database associated with user contributed website scripts that were contributed by users of the community.

In one embodiment, the one or more indicators of successful performance stored at STORE INDICATION OF SUCCESSFUL PERFORMANCE OPERATION 228 include one or more of a last date the user contributed website script was successfully performed, and a last time the user contributed web site script was successfully performed.

In one embodiment, one or more operations relating to STORE INDICATION OF SUCCESSFUL PERFOR- MANCE OPERATION 228 are performed with STORE WEBSITE SCRIPT OPERATION 224.

In one embodiment, following completion of STORE INDICATION OF SUCCESSFUL PERFORMANCE OPERATION 228, process flow proceeds with INCREASE THE NUMBER OF CONTRIBUTION POINTS ASSOCIATED WITH THE SCRIPT OPERATION 230.

In one embodiment, at INCREASE THE NUMBER OF CONTRIBUTION POINTS ASSOCIATED WITH THE SCRIPT OPERATION 230, the number of contribution points associated with the user contributed web site script is increased by a predetermined amount. In one embodiment, each successful performance of the operations of a user contributed website script triggers an increase in the number of contribution points associated with the user contributed website script of 100 points. In one embodiment, a first successful performance of the operations of a user contributed website script is worth more than the predetermined amount of points associated with each successful performance of the operations of the user contributed website script. In one embodiment, a first successful performance of the operations of a user contributed website script is worth 50 percent more than the predetermined amount. In one embodiment, a first successful performance of the operations of a user contributed website script is worth double the number of points associated with the predetermined amount.

In one embodiment, according to the example where a second table of a database is dedicated for storing data associated with user contributed website scripts contributed by users of the community, the number of contribution points associated with the user contributed website script is stored in the second table, and that number of contribution points is increased by the predetermined amount, upon successful performance of the user contributed website script.

In one embodiment, following completion of INCREASE THE NUMBER OF CONTRIBUTION POINTS ASSOCIATED WITH THE SCRIPT OPERATION 230, process flow proceeds with DOES THE NUMBER OF CONTRIBUTION POINTS ASSOCIATED WITH THE WEBSITE SCRIPT EXCEED A PREDETERMINED ACTIVATION THRESHOLD? OPERATION 232.

In one embodiment, at DOES THE NUMBER OF CONTRIBUTION POINTS ASSOCIATED WITH THE WEBSITE SCRIPT EXCEED A PREDETERMINED ACTIVATION THRESHOLD? OPERATION 232, a determination is made as to whether the number of contribution points associated with the user contributed website script exceeds a predetermined activation threshold.

Recall that, in one embodiment, discussed earlier, at STORE WEBSITE SCRIPT OPERATION 224, the user contributed website script was activated just for use by the contributing user and no other users, for example, users of the community.

In some situations, it may be desirable to initially activate user contributed website scripts only for users who contributed them, and later activate those user contributed website scripts for all users, for example, once the same scripts have been contributed by two or more contributing users.

In one embodiment, one measure of approximately how many contributing users have contributed a particular user contributed website script is the number of contribution points associated with a particular script. For example, if a user contributed website script is initially associated with 200 contribution points the first time it is successfully performed after being submitted by a contributing user, and subsequently receives an increase of 100 contribution points each time the user contributed website script is subsequently submitted by a different user, a contributed website script having 540 points is expected to have been contributed at separate times by either five or six different contributing users.

Because there may be reasons other than script contributions which may affect the number of contribution points associated with a particular user contributed website script, the number of contribution points associated with a particular user contributed website script is only loosely associated with the number of contributing users who have contributed that particular user contributed website script.

In one embodiment, at DOES THE NUMBER OF CONTRIBUTION POINTS ASSOCIATED WITH THE WEBSITE SCRIPT EXCEED A PREDETERMINED ACTIVATION THRESHOLD? OPERATION 232 the number of contribution points associated with the user contributed website script is compared with a predetermined activation threshold. In one embodiment, if the number of contribution points associated with the user contributed website script exceeds the predetermined activation threshold, process flow proceeds with ACTIVATE THE WEBSITE SCRIPT FOR ALL USERS OPERATION 234.

In one embodiment, at ACTIVATE THE WEBSITE SCRIPT FOR ALL USERS OPERATION 234, data associated with the user contributed website script, such as data of community scripts 136 of computing system 106, is added or updated to reflect that the particular user contributed website script is now available to be utilized on behalf of all users. In one embodiment, activating the user contributed website script for all users includes changing data in an entry associated with the user contributed website script from an indication that the user contributed website script is only available for use by or on behalf of the contributing user to an indication that the user contributed website script is available for use by or on behalf of any user of the community.

In one embodiment, following activation of the user contributed website script for all users, at ACTIVATE THE WEBSITE SCRIPT FOR ALL USERS OPERATION 234, process flow proceeds with PERFORM SCRIPT ON BEHALF OF A USER? OPERATION 236.

In one embodiment, at PERFORM SCRIPT ON BEHALF OF A USER? OPERATION 236, a determination is made whether to perform the user contributed website script, or any other website script, by or on behalf of any user, whether that user is the contributing user or a user of the community.

In one embodiment, performance of a particular website script, such as the user contributed web site script, may be triggered by any user for which the user contributed website script is presently activated.

For example, in a situation where process for user contributed website scripts 110 is included in a financial management system or other application software, a user may be presented options to either submit new user contributed website scripts, or to perform one or more already validated website scripts. In this situation, the user may select a validated website script to be performed on behalf of the user.

In another example, in a situation where process for user contributed website scripts 110 is included in a financial management system or other application software, it may be desirable to perform, automatically and without human intervention, the operations of one or more website scripts on data of the associated websites, on behalf of one or more users of the financial management system. In such a situation, performance of one or more website scripts, such as the user contributed website script, may take place regularly, such as once every 24 hours, once every 48 hours, or at any other time period or frequency desirable to a designer of a particular implementation of process for user contributed website scripts 110.

In one embodiment, if, at PERFORM SCRIPT ON BEHALF OF A USER? OPERATION 236, a determination is made to perform a website script, process flow proceeds with SCRIPT IS PERFORMED ON BEHALF OF A USER OPERATION 238.

In one embodiment, at SCRIPT IS PERFORMED ON BEHALF OF A USER OPERATION 238, the operations of the particular website script determined at PERFORM SCRIPT ON BEHALF OF A USER? OPERATION 236 are performed on data of the associated website, on behalf of a user.

In one embodiment, once the operations of the particular user contributed website script had been performed at SCRIPT IS PERFORMED ON BEHALF OF A USER OPERATION 238, process flow proceeds with WAS PERFORMANCE SUCCESSFUL? OPERATION 240.

In one embodiment, at WAS PERFORMANCE SUCCESSFUL? OPERATION 240, a determination is made as to whether each of the operations of the website script performed correctly.

In one embodiment, the operations of the website script will be determined to have performed correctly if they correctly retrieved user specific data of the website provided by web server 138 in the order specified by a contributing user who created the performed website script. In one embodiment, each operation of the website script was performed correctly, without failure of any kind.

In one embodiment, failure of any kind to perform the operations of the website script is not acceptable, and thus in a situation where any failure resulted from performance of the operations of the performed website script, a determination will be made that the operations of the performed website script performed unsuccessfully.

In one embodiment, if a determination was made at WAS PERFORMANCE SUCCESSFUL? OPERATION 240 that one or more of the operations of the performed website script did not perform correctly without failure, process flow proceeds with REDUCE THE NUMBER OF CONTRIBUTION POINTS ASSOCIATED WITH THE SCRIPT OPERATION 242.

In one embodiment, at REDUCE THE NUMBER OF CONTRIBUTION POINTS ASSOCIATED WITH THE SCRIPT OPERATION 242, the number of contribution points associated with the performed website script is reduced by a predetermined amount. Thus, in one embodiment, each failed performance of the operations of a performed website script triggers a reduction of the number of contribution points associated with the performed website script of a fixed number of contribution points. In one embodiment, a failed performance of the operations of a performed website script for a user other than a contributing user who contributed that particular performed website script is worth less than a failed performance of the operations of a performed website script for a contributing user who contributed that particular website script. In one embodiment, a failed performance of the operations of a performed website script for a contributing user is worth twice the number of contribution points of a failed performance of the operations of a performed website script for a user other than a contributing user. Variations of a number of contribution points associated with a reduction of contribution points associated with a failed performance of a particular performed website script will be readily appreciated by persons of ordinary skill.

In one embodiment, once the number of contribution points associated with a failed website script has been reduced, at REDUCE THE NUMBER OF CONTRIBUTION POINTS ASSOCIATED WITH THE SCRIPT OPERATION 242, process flow proceeds with RECORD AND STORE INDICATION OF FAILED PERFORMANCE OPERATION 243.

In one embodiment, at RECORD AND STORE INDICATION OF FAILED PERFORMANCE OPERATION 243, an entry is made into an execution history associated with the performed website script indicating data about the failed performance of the performed website script. Such data about the failed performance of the performed website script may include, but is not limited to, a date of the failed performance, a time of the failed performance, a reason for the failed performance, data indicating one or more operations of the performed website script that failed, data indicating one or more operations of the performed website script that performed correctly, or any other data deemed desirable by a designer of a particular implementation of process for user contributed website scripts 110.

Following completion of recording and storing data regarding the failed performance of the user contributed website script, at RECORD AND STORE INDICATION OF FAILED PERFORMANCE OPERATION 243 process flow proceeds with HAS THE NUMBER OF CONTRIBUTION POINTS FALLEN BELOW A PREDETERMINED THRESHOLD? OPERATION 244.

In one embodiment, at HAS THE NUMBER OF CONTRIBUTION POINTS FALLEN BELOW A PREDETERMINED THRESHOLD? OPERATION 244, a determination is made as to whether the number of contribution points associated with a particular website script, such as the failed website script, has fallen below a predetermined threshold below which the particular particular website script shall be limited in one or more ways. In one embodiment, a predetermined threshold is a threshold below which the particular website script shall be decommissioned for use by any user, including contributing users. In one embodiment, a predetermined threshold is a threshold below which the particular website script shall be decommissioned for use by users other than the contributing users. In one embodiment, there are two predetermined thresholds, a first threshold being a threshold below which the particular website script shall be decommissioned for use by any user, including contributing users, and a second threshold being a threshold below which the particular website script shall be decommissioned only for users other than contributing users.

In one embodiment, at HAS THE NUMBER OF CONTRIBUTION POINTS FALLEN BELOW A PREDETERMINED THRESHOLD? OPERATION 244, once a determination has been made that the number of contribution points associated with a particular website has fallen below a predetermined threshold, process flow proceeds with TAKE APPROPRIATE ACTION BASED ON THE PARTICULAR THRESHOLD INVOLVED OPERATION 246.

In one embodiment, at TAKE APPROPRIATE ACTION BASED ON THE PARTICULAR THRESHOLD INVOLVED OPERATION 246, in a version of process for user contributed website scripts 110 having a single predetermined threshold with respect to decommissioning a particular website script, the appropriate action based on the particular threshold involved is to decommission the particular website script entirely, thus rendering it unavailable for user by any user.

In one embodiment, at TAKE APPROPRIATE ACTION BASED ON THE PARTICULAR THRESHOLD INVOLVED OPERATION 246, in a version of process for user contributed website scripts 110 having a first threshold below which the particular website script shall be decommissioned for use by any user, including contributing users, and a second threshold being a threshold below which the particular website script shall be decommissioned only for users other than contributing users, the particular appropriate action to take depends on whether the number of contribution points associated with the particular website script fell below the first threshold, or whether the number of contribution points associated with the particular website script fell below the second threshold.

In one embodiment, using the example above, if the number of contribution points associated with the user contributed website script fell below the first threshold, the action taken at TAKE APPROPRIATE ACTION BASED ON THE PARTICULAR THRESHOLD INVOLVED OPERATION 246 is to decommission the particular website script entirely, so that it is unavailable for use by or on behalf of any user, including a contributing user.

In one embodiment, using the example above, if the number of contribution points associated with the user contributed website script fell below the second threshold, the action taken at TAKE APPROPRIATE ACTION BASED ON THE PARTICULAR THRESHOLD INVOLVED OPERATION 246 is to decommission the user contributed website script for users other than contributing users, so that it is available for use by or on behalf of any contributing user associated with this particular website script but is unavailable for use by or on behalf of users who are not contributing users associated with this particular website script.

In one embodiment, once one or more appropriate actions, as defined above, have been taken at TAKE APPROPRIATE ACTION BASED ON THE PARTICULAR THRESHOLD INVOLVED OPERATION 246, process flow proceeds with EXIT OPERATION 248 where process for user contributed website scripts 110 ends.

In the discussion above, if a determination was made, at ARE WEBSITE SCRIPTS NEEDED FOR ANY WEBSITES ASSOCIATED WITH WEBSITE ACCOUNTS OF THE USER? OPERATION 210, that process for user contributed website scripts 110 does not presently need any additional user contributed website scripts for any websites associated with website-based accounts of the user, process flow proceeds with PERFORM SCRIPT ON BEHALF OF A USER? OPERATION 236, where, as discussed above, a determination is made whether to perform the user contributed website script by or on behalf of any user, whether that user is the contributing user or a user of the community.

In one embodiment, performance of a particular user contributed website script, such as the user contributed website script, may be triggered by any user for which the user contributed website script is presently activated.

For example, in a situation where process for user contributed website scripts 110 is included in a financial management system or other application software, a user may be presented options to either submit new user contributed website scripts or to perform one or more already validated user contributed website scripts. In this situation, the user may select a validated user contributed website script to be performed on behalf of the user.

In another example, in a situation where process for user contributed website scripts 110 is included in a financial management system or other application software, it may be desirable to perform, automatically and without human intervention, the operations of one or more user contributed website scripts on data of the associated websites, on behalf of one or more users of the financial management system. In such a situation, performance of one or more user contributed website scripts, such as the user contributed website script may take place regularly, such as once every 24 hours, once every 48 hours, or at any other time period or frequency desirable to a designer of a particular implementation of process for user contributed website scripts 110.

As discussed above, in one embodiment, at DOES THE USER WEB BROWSER HAVE THE PLUG-IN INSTALLED? OPERATION 212, a determination is made as to whether a user web browser, such as web browser 126, of the user of computing system 102 has a script creation plug-in installed.

If, in one embodiment, at DOES THE USER WEB BROWSER HAVE THE PLUG-IN INSTALLED? OPERATION 212 a determination is made that the user web browser, such as web browser 126, does not have a script creation plug-in installed, process flow proceeds with LOAD AND ACTIVATE PLUG-IN INTO USER WEB BROWSER OPERATION 250.

In one embodiment, at LOAD AND ACTIVATE PLUG-IN INTO USER WEB BROWSER OPERATION 250, a copy of a script plug-in, such as plug-in 130, is downloaded from computing system 106 by computing system 102 and installed into the user web browser, such as web browser 126, and activated for use by a user of computing system 102.

In one embodiment, two or more different versions of a script creation plug-in may exist within computing system 106, for example, with different versions being appropriate for different types of web browsers, such as web browser 126. If so, computing system 106 identifies a particular version of web browser 126 being used by a user of computing system 102 and then using the data regarding a particular version of web browser 126 being used selects an appropriate version of plug-in 130 to be provided to computing system 102.

Following completion of loading and activating a script creation plug-in into web browser 126 of computing system 102 at LOAD AND ACTIVATE PLUG-IN INTO USER WEB BROWSER OPERATION 250, process flow proceeds with USER CREATES WEBSITE SCRIPT OPERATION 214.

As discussed above, in one embodiment, at DID THE OPERATIONS OF THE WEBSITE SCRIPT PERFORMED CORRECTLY? OPERATION 222, a determination is made as to whether the operations of the user contributed website script performed correctly.

In one embodiment, the operations of the user contributed website script will be determined to have performed correctly if they correctly retrieved user specific data of the website provided by web server 138 in the order specified by the user who created the user contributed website script. In one embodiment, each operation of the user contributed website script was performed correctly, without failure of any kind. In one embodiment, failure of any kind to perform the operations of the user contributed website script is not acceptable, and thus in a situation where any failure resulted from performance of the operations of the user contributed website script, a determination will be made that the operations of the user contributed website script performed unsuccessfully.

If, at DID THE OPERATIONS OF THE WEBSITE SCRIPT PERFORMED CORRECTLY? OPERATION 222, a determination was made that one or more of the operations of the user contributed website script performed incorrectly, process flow proceeds with REDUCE THE NUMBER OF CONTRIBUTION POINTS ASSOCIATED WITH THE SCRIPT OPERATION 242, as discussed above.

In the discussion above, in one embodiment, at DOES THE NUMBER OF CONTRIBUTION POINTS ASSOCIATED WITH THE WEBSITE SCRIPT EXCEED A PREDETERMINED ACTIVATION THRESHOLD? OPERATION 232, a determination was made as to whether the number of contribution points associated with the user contributed website script exceeds a predetermined activation threshold.

If, a determination was made that the number of contribution points associated with the user contributed website script does not exceed a predetermined activation threshold, process flow proceeds with PERFORM SCRIPT ON BEHALF OF A USER? OPERATION 236.

Earlier, in a discussion above, in one embodiment, at WAS PERFORMANCE SUCCESSFUL? OPERATION 240, a determination was made as to whether each of the operations of the user contributed website script performed successfully.

Recall that, in one embodiment, the operations of the user contributed website script will be determined to have performed successfully if the performed operations correctly retrieved user specific data of the website provided by web server 138 in the order specified by the user who created the user contributed website script. In one embodiment, the user contributed website script performed successfully if each operation of the user contributed website script was performed correctly, without failure of any kind.

In one embodiment, at WAS PERFORMANCE SUCCESSFUL? OPERATION 240 if a determination is made that the performed operations of the user contributed website script performed successfully and correctly, process flow proceeds with STORE INDICATION OF SUCCESSFUL PERFORMANCE OPERATION 228.

Recall that, in one embodiment, at HAS THE NUMBER OF CONTRIBUTION POINTS FALLEN BELOW A PREDETERMINED THRESHOLD? OPERATION 244, a determination is made as to whether the number of contribution points associated with a particular user contributed website script has fallen below a predetermined threshold below which the particular user contributed website script shall be limited in one or more ways.

In one embodiment, at HAS THE NUMBER OF CONTRIBUTION POINTS FALLEN BELOW A PREDETERMINED THRESHOLD? OPERATION 244, once a determination has been made that the number of contribution points associated with a particular website has not fallen below a predetermined threshold, process flow proceeds with EXIT OPERATION 248 and process for user contributed website scripts 110 ends.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of other process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various parties under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "aggregating", "alerting", "applying", "analyzing", "associating", "calculating", "capturing", "categorizing", "classifying", "comparing", "creating", "defining", "detecting", "determining", "distributing", "encrypting", "extracting", "filtering", "forwarding", "generating", "identifying", "implementing", "informing", "monitoring", "obtaining", "posting", "processing", "providing", "receiving", "requesting", "saving", "sending", "storing", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language, and it is appreciated that a variety of programming languages may be used to implement the teachings of the present invention as described herein, and any references to a specific language or languages are provided for illustrative purposes only.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity, and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the figures, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A system for user contributed website scripts comprising:
    at least one computing processor; and
    at least one memory coupled to the at least one computing processor, the at least one memory having stored therein instructions which when executed by any set of the at least one computing processors, perform a process for user contributed website scripts comprising:
    receiving user data identifying a user;
    determining a list of one or more websites for which a new user contributed website script is desired by
        determining one or more accounts of the user, resulting in user accounts:
            determining one or more billers having websites for which a less than satisfactory number of user contributed website scripts are accessible to the process for user contributed website scripts, resulting in prospective websites; and
        determining one or more prospective websites associated with one or more of the user accounts and preparing a determined list of the prospective websites associated with one or more of the user accounts;
    receiving user input selecting, from the determined list, a website of the one or more websites for which a new user contributed website script is desired;
    receiving, from the user, data of a user contributed website script of the selected website, resulting in the user becoming a contributing user, the data of the user contributed website script including one or more user contributed website script operations designed to be performed on the selected website to gather data of the user;
    determining whether the user contributed website script performs successfully;
    upon the user contributed website script being determined to have performed successfully, storing the user contributed website script and activating the user contributed website script for use on behalf of at least one user; and
    upon the user contributed website script being determined to have performed unsuccessfully, storing the user contributed website script and providing feedback to the contributing user.

2. A system for user contributed website scripts of claim 1 wherein the user data identifying the user includes authentication data sufficient to validate the user as a user authorized to contribute website scripts.

3. A system for user contributed website scripts of claim 2 wherein user data identifying the user is one or more of a user name and password.

4. A system for user contributed website scripts of claim 1 wherein activating the user contributed website script for use by at least one user comprises activating the website for use by the contributing user.

5. A system for user contributed website scripts of claim 1 further comprising:
    determining whether a script creation plug-in is active within a web browser of the user;
    if a script creation plug-in is not active within a web browser of the user, downloading the script creation plug-in, and activating the script creation plug-in;
    if a script creation plug-in was determined to be active within a web browser of the user, or has been downloaded and activated, receiving user input, through the plug-in, the user input comprising one or more script operations of a website script.

6. A system for user contributed website scripts of claim 1 wherein determining whether the user contributed website script performs successfully includes determining whether each of the operations of the data of the user contributed website script perform correctly without failure.

7. A system for user contributed website scripts of claim 1, wherein storing the user contributed website script and activating the user contributed website script for use on behalf of at least one user further comprises:
    increasing a number of award points associated with the contributing user.

8. A system for user contributed website scripts of claim 1, wherein storing the user contributed website script and activating the user contributed website script for use on behalf of at least one user further comprises:
    increasing a number of contribution points associated with the activated website script.

9. A system for user contributed website scripts of claim 8, wherein storing the user contributed website script and activating the user contributed website script for use on behalf of at least one user further comprises:
performing, during a script refresh period, the user contributed website script on data of the associated website;
determining that performance of one or more operations of the user contributed website script failed; and
reducing the number of contribution points associated with the user contributed website script.

10. A system for user contributed website scripts of claim 9, further comprising:
determining that the number of contribution points associated with the user contributed website script has fallen below a predetermined decommissioning threshold; and
adding or updating data reflecting a status of the user contributed website script to indicate that the user contributed website script is not available for use.

11. A system for user contributed website scripts of claim 10,
wherein determining that performance of one or more operations of the user contributed website script failed comprises:
determining that performance of one or more operations of the user contributed website script failed when used on behalf of a user other than the contributing user; and
adding or updating data reflecting a status of the user contributed website script to indicate that the user contributed website script is not available for use comprises:
adding or updating data reflecting a status of the user contributed website script to indicate that the user contributed website script is not available for use on behalf of users other than the contributing user.

12. A system for user contributed website scripts of claim 10,
wherein determining that performance of one or more operations of the user contributed website script failed comprises:
determining that performance of one or more operations of the user contributed website script failed when used on behalf of the contributing user; and
adding or updating data reflecting a status of the user contributed website script to indicate that the user contributed website script is not available for use comprises:
adding or updating data reflecting a status of the user contributed website script to indicate that the user contributed website script is not available for use by any user.

13. A system for user contributed website scripts of claim 1,
wherein after storing the user contributed website script and activating the user contributed website script for use on behalf of at least one user, the process for user contributed website scripts further comprises:
associating a number of contribution points with the user contributed website script.

14. A system for user contributed website scripts of claim 1, wherein storing the user contributed website script and activating the user contributed website script for use on behalf of at least one user comprises:
storing a representation of the user contributed website script in a location of a database associated with the contributing user.

15. A system for user contributed website scripts of claim 1,
wherein storing the user contributed website script and activating the user contributed website script for use on behalf of at least one user comprises:
storing a representation of the user contributed website script in a location of a database associated with a community of users.

16. A system for user contributed website scripts of claim 1, wherein determining whether the user contributed website script performs successfully comprises:
using the user data identifying the user to authenticate with the website;
performing each of the operations of the user contributed website script on data of the website; and
determining, as each operation of the user contributed website script completes, whether the performed operation completed correctly without failure.

17. A system for user contributed website scripts of claim 1, further comprising:
performing each operation of the user contributed website script on data of the website;
determining that each of the performed operations completed correctly without failure; and
increasing the number of contribution points associated with the user contributed website script.

18. A system for user contributed website scripts of claim 1, wherein the selected website is a website of a biller, the biller being a product or service provider that provides products or services on behalf of the user.

19. A system for user contributed website scripts comprising:
a first computing system under the control of a user;
a second computing system operatively coupled to the first computing system and configured to manage the collection and evaluation of website scripts from a community of users;
at least one computing processor; and
at least one memory coupled to the at least one computing processor, the at least one memory having stored therein instructions which when executed by any set of the at least one computing processors, perform a process for user contributed website scripts comprising:
receiving, at the second computing system from the first computing system, user data identifying a user;
determining, at the second computing system, a list of one or more websites for which a new user contributed website script is desired by
determining one or more accounts of the user, resulting in user accounts;
determining one or more billers having websites for which a less than satisfactory number of user contributed website scripts are accessible to the process for user contributed website scripts, resulting in prospective websites; and
determining one or more prospective websites associated with one or more of the user accounts and preparing a determined list of the prospective websites associated with one or more of the user accounts;
receiving, at the second computing system from the first computing system, user input selecting, from the determined list, a website of the one or more websites for which a user website script contribution is desired;
receiving, at the second computing system from the first computing system, data of website script of the selected website, resulting in a contributed website script contributed by a contributing user, the data of the user contributed website script including one or more website script operations designed to be performed on the selected website to gather data of the user;

determining, at the second computing system, whether the user contributed website script performs successfully;

upon the user contributed website script being determined to have performed successfully, storing, by the second computing system, the user contributed website script and activating, by the second computing system, the user contributed website script for use on behalf of at least one user; and upon the user contributed website script being determined to have performed unsuccessfully, storing, by the second computing system, the user contributed website script and providing feedback, by the second computing system, to the contributing user.

20. A system for user contributed website scripts of claim 19, wherein the user data identifying the user includes authentication data sufficient to validate the user as a user authorized to contribute website scripts.

21. A system for user contributed website scripts of claim 20, wherein user data identifying the user is one or more of a user name and password.

22. A system for user contributed website scripts of claim 19, wherein activating the website for use by at least one user comprises activating the website for use by the contributing user.

23. A system for user contributed website scripts of claim 19, further comprising:
   determining whether a script creation plug-in is active within a web browser of the user;
   if a script creation plug-in is not active within a web browser of the user, downloading the script creation plug-in, and activating the script creation plug-in;
   if a script creation plug-in was determined to be active within a web browser of the user, or has been downloaded and activated, receiving user input, through the plug-in, the user input comprising one or more script operations of a website script.

24. A system for user contributed website scripts of claim 19, wherein determining whether the user contributed website script performs successfully comprises:
   determining whether each of the operations of the data of the user contributed website script perform correctly without failure.

25. A system for user contributed website scripts of claim 19, wherein storing the user contributed website script and activating the user contributed website script for use on behalf of at least one user further comprises:
   increasing a number of award points associated with the contributing user.

26. A system for user contributed website scripts of claim 19, wherein storing the user contributed website script and activating the user contributed website script for use on behalf of at least one user further comprises:
   increasing a number of contribution points associated with the activated website script.

27. A system for user contributed website scripts of claim 26, wherein storing the user contributed website script and activating the user contributed website script for use on behalf of at least one user further comprises:
   performing, during a script refresh period, the user contributed website script on data of the associated website;
   determining that performance of one or more operations of the user contributed website script failed; and
   reducing the number of contribution points associated with the user contributed website script.

28. A system for user contributed website scripts of claim 27, further comprising:
   determining that the number of contribution points associated with the user contributed website script has fallen below a predetermined decommissioning threshold; and
   adding or updating data reflecting a status of the user contributed website script to indicate that the user contributed website script is not available for use.

29. A system for user contributed website scripts of claim 28 wherein determining that performance of one or more operations of the user contributed website script failed comprises:
   determining that performance of one or more operations of the user contributed website script failed when used on behalf of a user other than the contributing user; and
   adding or updating data reflecting a status of the user contributed website script to indicate that the user contributed website script is not available for use comprises:
   adding or updating data reflecting a status of the user contributed website script to indicate that the user contributed website script is not available for use on behalf of users other than the contributing user.

30. A system for user contributed website scripts of claim 28 wherein determining that performance of one or more operations of the user contributed website script failed comprises:
   determining that performance of one or more operations of the user contributed website script failed when used on behalf of the contributing user; and
   adding or updating data reflecting a status of the user contributed website script to indicate that the user contributed website script is not available for use comprises:
   adding or updating data reflecting a status of the user contributed website script to indicate that the user contributed website script is not available for use by any user.

31. A system for user contributed website scripts of claim 19, wherein after storing the user contributed website script and activating the user contributed website script for use on behalf of at least one user, the process for user contributed website scripts further comprises:
   associating a number of contribution points with the user contributed website script.

32. A system for user contributed website scripts of claim 19, wherein storing the user contributed website script and activating the user contributed website script for use on behalf of at least one user comprises:
   storing a representation of the user contributed website script in a location of a database associated with the contributing user.

33. A system for user contributed website scripts of claim 19, wherein storing the user contributed website script and activating the user contributed website script for use on behalf of at least one user comprises:
   storing a representation of the user contributed website script in a location of a database associated with a community of users.

34. A system for user contributed website scripts of claim 19, wherein determining whether the user contributed website script performs successfully comprises:

using the user data identifying the user to authenticate with the website;

performing each of the operations of the user contributed website script on data of the website; and determining, as each operation of the user contributed website script completes, whether the performed operation completed correctly without failure.

35. A system for user contributed website scripts of claim 19, further comprising:

performing each operation of the user contributed website script on data of the website;

determining that each of the performed operations completed correctly without failure; and increasing the number of contribution points associated with the user contributed website script.

36. A system for user contributed website scripts of claim 19, wherein the selected website is a website of a biller, the biller being a product or service provider that provides products or services on behalf of the user.

* * * * *